US009967554B2

(12) United States Patent
Seifert et al.

(10) Patent No.: US 9,967,554 B2
(45) Date of Patent: May 8, 2018

(54) MULTI-VIEWER AUTOSTEREOSCOPIC TABLETOP DISPLAY WITH DYNAMIC PARALLAX BARRIER AND DIRECTIONAL BACKLIGHT (71) Applicant: DISNEY ENTERPRISES, INC., Burbank, CA (US)

(72) Inventors: Hagen Friedrich Seifert, Zurich (CH); Quinn Y. Smithwick, Pasadena, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 272 days.

(21) Appl. No.: 15/058,303

(22) Filed: Mar. 2, 2016

(65) Prior Publication Data

US 2017/0257622 A1 Sep. 7, 2017

(51) Int. Cl.
*H04N 9/47* (2006.01)
*H04N 13/04* (2006.01)
*G02B 27/22* (2018.01)
*G02F 1/13* (2006.01)
*G02F 1/1335* (2006.01)

(52) U.S. Cl.
CPC ..... *H04N 13/0413* (2013.01); *G02B 27/2214* (2013.01); *G02F 1/1323* (2013.01); *G02F 1/133504* (2013.01); *G02F 1/133553* (2013.01); *H04N 13/047* (2013.01); *H04N 13/0484* (2013.01); *H04N 13/0497* (2013.01); *G02F 2201/34* (2013.01); *G02F 2201/56* (2013.01); *H04N 2213/001* (2013.01)

(58) Field of Classification Search
CPC .............. G02B 6/0048; G02B 27/0093; G02B 27/2264; G02B 27/2214; G06T 15/20
USPC .......................... 348/54, 55; 349/15; 345/419
See application file for complete search history.

(56) References Cited

U.S. PATENT DOCUMENTS

| 2008/0143895 A1* | 6/2008 | Peterka | G02B 27/0093 349/15 |
| 2010/0328306 A1* | 12/2010 | Chau | G02B 27/2214 345/419 |
| 2012/0062565 A1* | 3/2012 | Fuchs | G06T 15/20 345/419 |

(Continued)

*Primary Examiner* — Gims S Philippe
(74) *Attorney, Agent, or Firm* — Marsh Fischmann & Breyfogle LLP; Kent A. Lembke (57) ABSTRACT An apparatus for displaying three dimensional (3D) images to a viewer without the need for 3D glasses. The apparatus includes a first display device horizontally oriented and operable to alternately display a first parallax and a second parallax barrier. The first parallax barrier corresponds with a first viewer location and the second parallax barrier corresponds with a second viewer location. The apparatus includes a second display device positioned parallel to the first display device and operable to alternately display first 3D content corresponding with the first viewer location and second 3D content corresponding with the second viewer location. The apparatus includes a directional backlight assembly alternately backlighting the second display device with first light directed toward the first viewer location and second light directed toward the second viewer location. The apparatus includes a controller synchronizing time multiplexed operations of the first and second display devices and the directional backlight assembly.

21 Claims, 7 Drawing Sheets (56) References Cited

U.S. PATENT DOCUMENTS

| | | | |
|---|---|---|---|
| 2012/0314145 A1* | 12/2012 | Robinson | G02B 6/0048 349/15 |
| 2015/0002767 A1* | 1/2015 | Eichenlaub | G02B 27/2214 349/15 |
| 2016/0105665 A1* | 4/2016 | Wang | G02B 27/2264 348/55 |

* cited by examiner

MULTI-VIEWER AUTOSTEREOSCOPIC TABLETOP DISPLAY WITH DYNAMIC PARALLAX BARRIER AND DIRECTIONAL BACKLIGHT

BACKGROUND

1. Field of the Description

The present invention relates, in general, to devices and methods for providing a three-dimensional (3D) display in a glasses-free manner, and, more particularly, to a display system adapted for using a horizontally-oriented display (e.g., "a 3D tabletop display") to display high quality 3D images (left and right eye images) to one or more viewers' eyes that can be viewed without the need for the viewer to use special glasses, headgear, or filters (e.g., glasses-free 3D or autostereoscopic) as the viewers are free to move all around the display such that it functions as a 360-degree autostereoscopic tabletop display.

2. Relevant Background

Displays that provide the illusion of three dimensions have experienced a rebirth in the past few years. For example, a number of 3D televisions are now available for use in homes and home theaters. These 3D televisions generally operate by displaying a stream of left and right eye images in an alternating or time-multiplexed manner (e.g., left-right-left-right). Switching occurs so quickly that the viewer does not sense a flicker or change in the display. The viewer wears special headgear or glasses that operate in a synchronized manner with the display to only allow the light associated with the left eye image to reach the viewer's left eye and with the right eye image to reach the viewer's right eye.

While most commercial displays rely on the use of special glasses, it is generally agreed by those in the 3D entertainment industry that displays able to provide a 3D viewing experience without glasses or headgear offer significant advantages. Autostereoscopy is any method of displaying stereoscopic images (i.e., adding binocular perception of 3D depth) without the use of special glasses or headgear on the part of the viewer. Many autostereoscopic or glasses-free 3D displays have been developed using a variety of technologies including lenticular lenses on the display screen combined with interlaced content, screens configured as parallax barriers, volumetric displays, and holographic and light field displays. However, each display technology has to date been proven to have limitations that have limited their widespread adoption.

For example, 3D televisions have been configured as lenticular autostereoscopic displays. The 3D lenticular television is mounted vertically on a wall or on a support base, and a viewer has multiple view images directed toward their eyes through a plurality of lenticules (or elongated lenses) that extend vertically upward or in a slanted manner upward on the outer surface of the display monitor. The 3D lenticular television may provide 1920 by 1200 pixels that are used to display an 8-view autostereoscopic image through the lenticules (or lens array or lenticular sheet). To this end, the image content (or digital image file) is interdigitated or interlaced as a number of slices (e.g., 8 slices in this example) of images that include multiple view images to provide the 3D effect, and the set of interlaced slices are displayed and repeated under each lenticule. These 3D televisions have a number of drawbacks in practice. The viewer typically has to remain in a particular location relative to the front surface (lenticular sheet) of the display/monitor such as directly in front of the display/monitor and with their head (and left and right eyes) at a predefined height (e.g., a height matching the center of the display/monitor). The lenticular 3D television only provides views horizontally so if the viewer is at too great of a height (or too low of a height) the 3D image is viewed from an incorrect perspective, resulting in a distorted image that appears in an undesirable or unrealistic manner.

More recently, there has been a demand in the 3D display industry for an autostereoscopic tabletop display (e.g., a horizontal display) adapted for use by multiple viewers that are free to move fully around the tabletop display to provide a 360-degree display device. These types of devices allow the users or viewers to observe and interact with displayed 3D content that shares the same 3D space as real world objects such as 3D objects (e.g., game pieces, model objects for 3D design, and the like) placed on the table or near its upper, exposed surface. Such autostereoscopic tabletop displays are desirable because they allow interactive experiences such as for visitors of an entertainment facility (e.g., an amusement park), facilitate collaborative design among two or more designers or engineers as they can quickly visualize 3D objects and move them in a 3D space relative to each other (e.g., support computer-aided design), and would be useful in many educational settings.

Many commonly used concepts for vertical autostereoscopic displays cannot be readily applied to a 360-degree autostereoscopic tabletop display. For example, lenticular lens and static parallax barrier-based, multi-view displays can only provide parallax in one direction, which would not support a viewer moving around the outside periphery of a tabletop display (e.g., would not support a 360-degree display). Integral 3D displays using lenslet arrays can offer parallax in two directions, but, like lenticular lens and static parallax barrier-based displays, these displays suffer from small viewing angles and periodic view repetition.

Another well-explored approach to 360-degree autostereoscopic displays involves using high-speed projectors that generate a large amount of views in combination with rotating anisotropic projection screens to redirect the views in the appropriate direction. In some of the designs, the rotating projection screen intersects with the displayed volume while others use a flat screen to create a tabletop display. Still others have used a known optical illusion using two facing parabolic mirrors to re-image the rotating screen above the tabletop display's surface. While useful in some applications or settings, a common drawback of all of these systems is the low bit-depth of all displayed images due to the nature of the high-speed projectors and the fast-spinning projection screens.

Light field displays with a large number of views at full resolution and bit-depth can be achieved using an array of projectors. Using a special conical-shaped diffuser, this approach has been adapted to a 360-degree tabletop display. However, an obvious drawback of these designs is the very high cost associated with the required large number (e.g., hundreds) of projectors. Furthermore, the calibration of the projectors can be especially challenging.

Hence, there remains a need for a new design for an autostereoscopic tabletop display. Preferably, this new design will allow a viewer or user of the display to move freely around the entire periphery of the display to provide a 360-degree display. Also, it is preferable that the new design provide a less complex device with fewer components (e.g., without the need for hundreds of projectors), fewer moving parts (e.g., without spinning projection screens), and fewer operational challenges (e.g., less calibration challenges).

SUMMARY

The inventors determined that there was a need for 3D displays that can be oriented horizontally, as in a tabletop, rather than just vertically, as in a portrait display. Vertically oriented 3D displays, such as lenticular 3D televisions/displays, are useful for presenting a 3D object to a viewer, but the object appears to "float" in space and has no connection to the ground or surrounding environment, and the perspective remains on-axis and does not appreciably change in appearance with changes in viewing distance. In contrast, a horizontal 3D display or 3D tabletop display would be desirable if it could display a 3D object or image that appeared to be supported and cast (virtual) shadows upon the display's upper (and outer) surface. Furthermore, as the viewer gets closer or further from the 3D tabletop, the perspective of the object may change significantly from an overhead view to an off-axis view.

In this regard, tabletop or sandbox displays allow a viewer to easily examine the object from very different angles by simply and naturally moving left-right or closer-further away from the table. Similarly, 3D tabletop displays can present 3D objects that appear to be placed on the table, extending a distance above the table top, with an added sense of weight and solidity. The ability for each viewer or user to see a different viewpoint of the synthetic object (displayed 3D image) or for a single user to see multiple viewpoints of the 3D object further adds to the sense of presence of the 3D object. Further, autostereoscopic 3D tabletops (or sandbox displays) are considered the ultimate implementation as a user may naturally view the 3D objects apparently on the tabletop without the encumbrances of 3D glasses, and the inventors teach several embodiments of such autostereoscopic 3D tabletop displays (or automultiscopic 3D tabletop displays or simply "3D tabletop displays" or "3D tabletops") in the following description.

More particularly, an autostereoscopic tabletop display apparatus is provided for displaying three dimensional (3D) images to one-to-four or more viewers. The apparatus includes a first display device horizontally oriented and operable to alternately display a first parallax and a second parallax barrier. The first parallax barrier corresponds with (e.g., is generated specifically for) a first viewer location relative to the first display device and the second parallax barrier corresponds with a second viewer location differing from the first viewer location. The apparatus also includes a second display device positioned parallel to the first display device and operable to alternately display first 3D content corresponding with the first viewer location and second 3D content corresponding with the second viewer location. Further, the apparatus includes a directional backlight assembly operable to alternately backlight the second display device with first light directed toward the first viewer location and with second light directed toward the second viewer location. Still further, the apparatus includes a controller synchronizing time multiplexed operations of the first display device, the second display device, and the directional backlight assembly whereby the first parallax barrier, the first 3D content, and the first light are provided concurrently and the second parallax barrier, the second 3D content, and the second light are provided concurrently.

During operations of the apparatus, the controller generates the first parallax barrier and the first 3D content and also operates the directional backlight assembly based on the first viewer location. Further, the controller generates the second parallax barrier and the second 3D content and operates the directional backlight assembly based on the second viewer location. In some implementations, the display apparatus also includes a tracker assembly determining the first and second viewer locations, and the first and second viewer locations define orientation and pitch for eyes of first and second viewers being tracked by the tracker assembly.

In some particular implementations of the display apparatus, the directional backlight assembly includes a transparent light support with a hemispherical outer surface supporting a plurality of light sources that are independently addressable and operable to provide the first and second light. The directional backlight assembly may then further include a reflector element with a hemispherical, mirrored inner surface facing the hemispherical outer surface of the transparent light support to reflect the first and second light through the transparent light support to backlight the second display device. In such implementations, the hemispherical outer surface has a first radius, the hemispherical, mirrored inner surface has a second radius, and the first radius is in the range of 45 to 55 percent of the second radius (e.g., is about half the second radius). During use of the display apparatus, a first subset of the light sources is operated concurrently to provide the first light and a second subset of the light sources, differing from the first subset of the light sources, is operated concurrently to provide the second light. The light sources may each be (or include) a light emitting diode (LED) mounted on the hemispherical outer surface to direct light toward the hemispherical, mirrored inner surface of the reflector element.

According to another aspect of the present description, an autostereoscopic tabletop display method is provided for displaying autostereoscopic content to two or more viewers. The method includes determining a location of a first viewer's eyes relative to a horizontal plane (such as with a tracker assembly and/or a display controller processing the tracker assembly data). The method also includes determining a location of a second viewer's eyes relative to the horizontal plane. Then, the method includes first backlighting a display assembly with light directed toward the location of the first viewer's eyes, and, during the first backlighting, operating the display assembly to display first autostereoscopic content. Then, after the first backlighting, the method includes second backlighting the display assembly with light directed toward the location of the second viewer's eyes, and, during the second backlighting, operating the display assembly to display second autostereoscopic content differing from the first autostereoscopic content. These steps are repeated in a switching manner (e.g., at a rate or frequency such as 30 to 60 Hertz (Hz) to avoid flicker with one implementation using 120 Hz for a single viewer, 60 Hz for two viewers, 40 Hz for three viewers, and 30 Hz for four viewers) to provide time multiplexing of the displaying and backlight steps.

In some embodiments, the first and second backlighting are performed by a directional backlight assembly comprising a transparent light support with a hemispherical outer surface supporting a plurality of light sources that are independently addressable and operable to provide the light during the first and second backlighting. In these embodiments, the directional backlight assembly further comprises a reflector element with a hemispherical, mirrored inner surface facing the hemispherical outer surface of the transparent light support to reflect the first and second light through the transparent light support to backlight the second display device. Further, the hemispherical outer surface has a first radius, the hemispherical, mirrored inner surface has a second radius, and the first radius is in the range of 45 to 55 percent of the second radius (e.g., half the second radius).

In some specific exemplary implementations of the method, the first autostereoscopic content includes a first parallax barrier and a first set of 3D content generated based on the location of the first viewer's eyes and the first parallax barrier (e.g., the method may include this generating step(s)). Further, the second autostereoscopic content includes a second parallax barrier and a second set of 3D content generated based on the location of the second viewer's eyes and the second parallax barrier (e.g., the method may include this generating step(s)). The first parallax barrier differs from the second parallax barrier as these are generated to suit the two differing locations of the two viewer's eyes. The locations of the first and second viewer's eyes each includes an angular orientation and a pitch of the viewer's eye locations.

DETAILED DESCRIPTION

Briefly, a multi-viewer autostereoscopic tabletop display (or, more simply, a 3D tabletop display or tabletop display) is described that allows a viewer or user to view a 3D image or object on, above, below and/or straddling an upper, outer surface of the 3D tabletop display while the user is free to move relative to the upper, outer surface within a viewing space. The user or viewer may move around the entire periphery and view 3D content without glasses such that the displays of the present description are 360-degree autostereoscopic devices. To allow one, two, or more users to freely move about the tabletop display while viewing full 3D content, the tabletop display makes use dynamic parallax barriers along with a lighting assembly that provides directional backlights synchronized with left and right eye content displayed to each viewer through the dynamically-generated parallax barriers.

In brief, the viewer's location (height, orientation, and pitch relative to the tabletop's upper surface) is tracked, and a parallax barrier (with appropriate pitch and orientation) is generated to suit the present location of the viewer's eyes. Content is generated and displayed that is suited to the eyes' viewpoints and the parallax barrier, and backlighting is identified to illuminate a light box (e.g., a collimated area) associated with the viewer's face (e.g., to at least cover their left and right eyes). Operation of these lights in the lighting assembly is synchronized with operation of a first display device to provide the parallax barrier and of a second display device to provide the left and right eye content (which is visible due to the backlighting by the lighting assembly). Similar operations of the autostereoscopic tabletop display (which may also be referred to as a system or an apparatus) are performed using time multiplexing (e.g., content provided to each viewer in a time multiplexed manner) for each of the one, two, or more viewers (e.g., 1 to 4 is a common operating mode for the display operating at 120 Hertz or 30 Hertz per each of the 4 viewers/users of the display to limit viewing issues for the 3D content).

The inventors recognized that it may be useful to combine a dynamic parallax barrier with a directional backlight, but, based on their unique combined experience in the field, they also understood that there are several problems associated with use of parallax barriers and direction backlights that would need to be overcome to achieve a useful autostereoscopic tabletop display. First, with regard to use of parallax barriers, traditional lenticular sheets and parallax barriers have a fixed orientation. This works reasonably well for a vertical screen since the orientation of the viewer's eyes to the screen is always the same, e.g., the parallax barrier is vertical or slightly tilted while the viewer's eyes are in a horizontal plane. However, on a tabletop display, a viewer can walk all the way around the screen. In this case, there is a position(s) where a fixed orientation parallax barrier would align with the viewer's eyes, and, as a result, no parallax could be shown and, therefore, no 3D content could be displayed to the viewer in this position.

Second, with regard to use of directional backlights, a directional backlight is a backlight that makes the displayed content visible from certain viewing positions while the screen appears black from other viewing positions (i.e., no content is seen in these operating states of the backlight). For a tabletop display, the inventors understood that the backlight should be designed to be able to individually address and operate lights within the backlight to direct light outward to a large number of viewing positions all around the tabletop so as to provide a desirable combined solid angle, e.g., a solid angle of nearly one hemisphere. Techniques for overcoming these challenges are discussed in detail in the following description.

Figure 1:
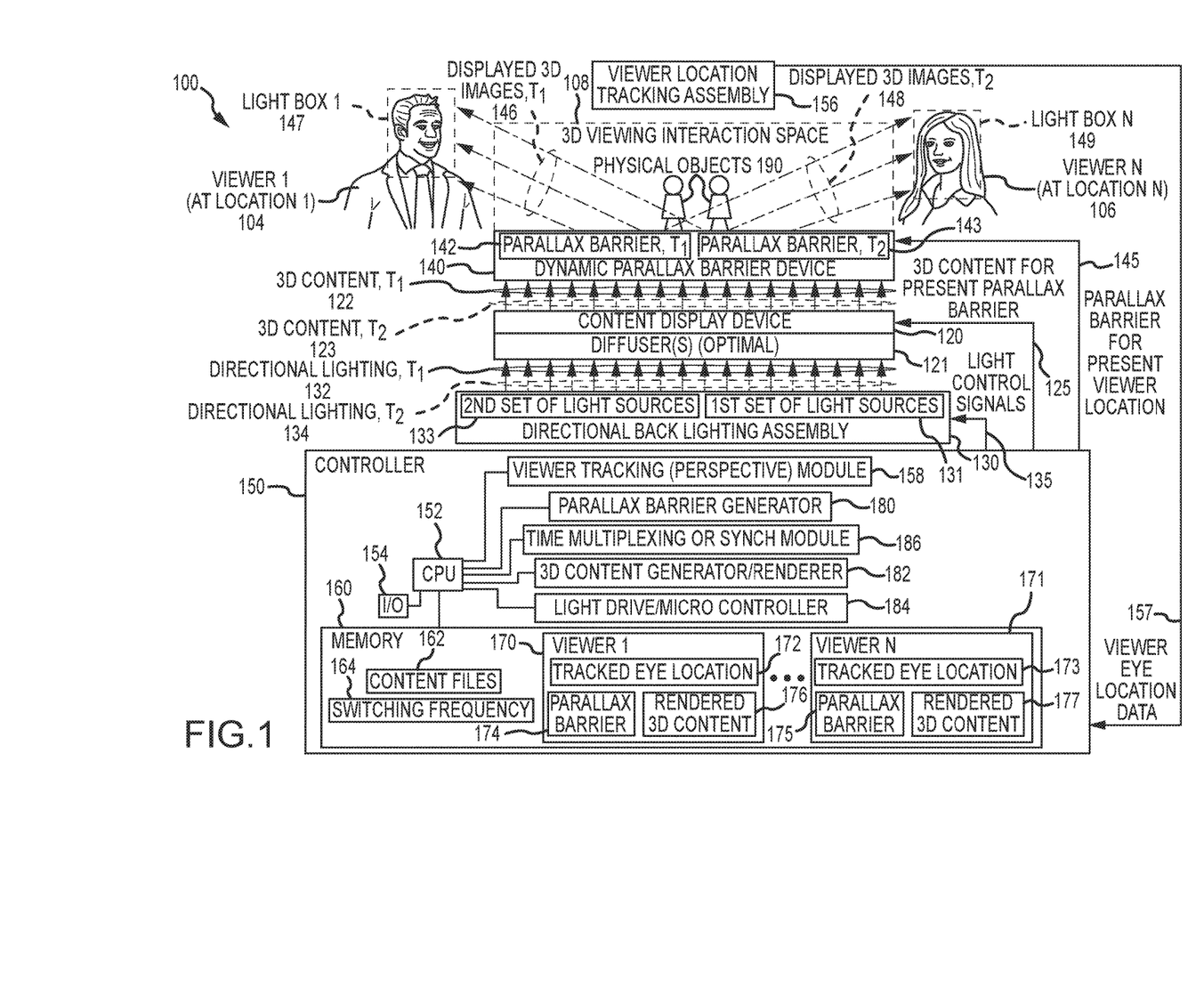
FIG. 1 illustrates a functional block diagram of a multi-viewer autostereoscopic tabletop display system of the present description.

FIG. 1 illustrates a functional block diagram of a multi-viewer autostereoscopic display (or display system) 100 of the present description. As shown, a first viewer 104 is viewing a 3D viewing and interaction space 108 above the display devices 120, 140 used to display 3D content 146 to viewer 104. In a typical implementation a top cover of glass or plastic (not shown) will be provided over these display devices 120, 140, and the system 100 may include one or more physical 3D objects 190 that can be positioned on this top cover in the viewing and interaction space 108 for viewing concurrently with the 3D imagery 146 (e.g., to play an interactive game with real pieces and virtual pieces/effects, to perform CAD design, and the like).

The system 100 may be used to display 3D content to one, two, or more viewers (e.g., 1 to 4 is a common number of viewers), and a second (or viewer "N" indicating the second, third, fourth, or more viewer) viewer 106 is shown viewing the 3D space 108 at a second (or "N") location that differs from the location (or "Location 1") of the first viewer 104. The two locations of the viewers 104, 106 or their eye pair locations (or head location) differ and, as a result, each is viewing the space 108 from differing viewing angles or perspectives, which may be defined by an angular orientation relative to a center axis passing through the space 108 or display devices 120, 140 and an angle relative to the horizontal upper surface of the top cover or screen/panel of display device 140 in some embodiments.

The display system 100 operates in a time multiplexed manner so that one set of 3D images 146 are displayed and viewable by the viewer 104 while substantially concurrently (e.g., with rapid switching) a second set of 3D images 148 that differ from the first set 146 are displayed and viewable by the viewer 106 at the second, different location. In practice, the two image sets 146, 148 are rendered so as to provide a proper perspective of a 3D object(s) or imagery from the different locations of the viewers 104, 106, e.g., as a viewer walks around a virtual 3D object the content associated with that virtual 3D object are changed such as by showing a vehicle from the front, from either side, and from the back and at various pitches (viewer heights).

To this end, the content display device 120 is operated via control signals 125 from a controller 150 in a switched manner to display first 3D content 122 at a first time and then display second 3D content 123 at a second time and these contents (which may change over time such as when a viewer moves location or the image is a video image) are displayed in an alternating pattern over an operating time period of the system (e.g., display content for viewer 104, display content for viewer 106, display content for viewer 104, display content for viewer 106, and so on) such as with each viewer receiving content at 30 Hertz (e.g., with a 120 Hertz controller 150 providing content for up to four viewers or the like).

The content 122, 123 is rendered for viewing through a particular parallax barrier 142, 143 generated and displayed by the dynamic parallax barrier device 140 (e.g., a transparent LCD panel or the like) in response to control signals 145 from the controller 150. Particularly, in a switching manner over time, the first parallax barrier 142 is displayed at a first time (during a first time period) while the content display device 120 is operating to display the first 3D content 122, and this results in displayed 3D images 146 being visible in a light box 147 (e.g., an elongated rectangular or column with a width of at least that of an average human and a length of 4 to 8 inches or more to provide light associated with left and right eye images to the viewer 104 and their eyes in the first location). The second parallax barrier 143 is displayed at a second time (during a second time period after the first time period ends) (alternating over time with the first parallax barrier 142) while the content display device 120 is operating to display the second 3D content 123, and this results in displayed 3D images 148 being visible in a light box 149 (that may be provided at a location associated with viewer 106 and the present location of this viewer's eyes).

To provide the images/light 146, 148 to the light boxes 147, 149 and the two viewers 104, 106 in their two different locations, a directional backlighting assembly 130 is included in the display system 100. The assembly 130 includes a plurality of separately addressable/controllable (or addressable in sets or strips) light sources that can be operated in response to driver or control signals 135 to direct light 146, 148 to the viewers 104, 106 that may be at any of hundreds to thousands or more of locations about the periphery (e.g., 360-degree display ability) of the top cover or display device 140. A diffuser 121 may be provided between the content display device 120 and the directional backlighting assembly 130 to provided desired diffusion of light in creating the content output 122, 123.

Operations of the backlighting assembly 130, i.e., signals 135, are synchronized with the operations of the devices 120, 140 through control signals 125, 145. Particularly, the driver/control signals 135 operate the backlighting assembly 130 at the first time (during a first time period), in which the two display devices 120, 140 are being operated as discussed above, to provide first directional lighting 132 with a first set of light sources 131 and then at the second time, in which the two display devices 120, 140 are being operated as discussed above, to provide second directional lighting 134 with a second set of light sources 133. The second set of light sources 133 differs from the first set of light sources 131, with the light sources in each set 131, 133 being chosen to provide the directional light associated with displayed 3D images 146, 148, respectively, to create the light boxes 147, 149 to allow the two viewers 104, 106 at different locations to view 3D content displayed by content display device 120 via parallax barriers displayed by the device 140.

To provide the accurately synchronized operations of the content display device 120, the directional backlighting assembly 130, and the dynamic parallax barrier device 140, the display system 100 includes a controller 150 that functions to synchronize the generation and transmittal of the control signals 125, 135, and 145. To this end, the controller 150 includes a processor 152 that manages operations of input and output devices 154 that may include devices, well-known in the industry, for communicating in a wired or wireless manner the signals 125, 135, 145 to the content display device 120, the parallax barrier display device 140, and the lighting assembly 130. Further, the processor 152 manages memory 160, e.g., memory devices, storage devices, and the like that may be provided in the controller 150 or accessible by wired or wireless communications by the controller 150 and also executes code, executable instructions, software, and the like to provide modules or mechanisms 158, 180, 182, 186, and 184 to provide the display functions described herein.

Particularly, the display system 100 includes tracking equipment in a viewer tracking assembly 156, and the CPU 152 executes code to provide a viewer tracking module (or perspective determination mechanism) 158 that processes data 157 from the tracking assembly 156 to determine the locations of the viewers 104, 106 relative to the parallax barrier device 140 (and/or a top cover provided over the device 140). A wide variety of tracking devices may be used to practice the display system 100, and the assembly 156 is adapted to provide data 157 that is useful for allowing the module 158 to determine present locations of the eyes of the viewers 104, 106. In some embodiments, the location information that is determined is an orientation and a pitch of the eyes such as an angular offset from a central axis passing through the parallax barrier device 140 (or top cover) and an angular offset from a horizontal plane containing a top surface of the parallax barrier device 140 (or an upper surface of the top cover). The CPU 152 is shown to create records 170, 171 in memory 160 for each viewer 104, 106, and the tracked or determined location (e.g., eye location or perspective) of each viewer 104, 106 is stored in these records 170, 171 as shown at 172, 173.

The processor 152 also runs code to provide a parallax barrier generator 180 and a 3D content generator/renderer 182. The parallax barrier generator 180 processes the tracked eye locations 172, 173 to generate parallax barriers 174, 175 that are appropriate for viewing left and right eye (3D) content at the particular locations 172, 173 of the viewers 104, 106. Likewise, the renderer 182 (e.g., a game engine or the like) processes content files 162 that may be a still 3D image or video 3D image stream to render 3D content (left and right eye) 176, 177 that is suited for viewing by the viewers 104, 106 at their present eye locations 172, 173 (at a particular viewing angle), and this content 176, 177 is suited for the parallax barriers 174, 175.

Further, the processor 152 executes code or manages operations of a light driver/microcontroller 184 to selectively operate sets of light sources in the backlighting assembly 130 via light control signals 135. In this example, a first set of lights 131 is chosen for generating directional lighting 132 to direct light 146 to the first viewer 104 (or provide light box 147) and a second set of lights 133 is chosen for generating directional lighting 134 to direct light 148 to the second viewer 106 (or provide light box 149). These light source sets or their definition may also be stored in the records 170, 171 in memory 160. Still further, the processor 152 executes code to provide a module 186 that functions to synchronize (such as by extracting video signals to provide accurate synchronization) the generation and/or transmittal of the control signals 125, 135, 145 to the devices 120, 130, 140, which are provided to alternate delivery of light/3D content 146, 148 to the viewers 104, 106 in a time multiplexed manner (as discussed above).

In this way, 3D content suited for a viewer's current location and present parallax barrier is displayed during the same time period that a parallax barrier suited for the viewer's perspective is displayed and sets of light sources are operated to provide directional lighting of the content display device. The locations of the viewers 104, 106 may change during the operation of the system 100, and the records 170, 171 are updated to reflect the new viewing angles/perspectives. Additionally, one or more viewers may be added or removed from the group of viewers 104-106, and the system 100 operates to support these changes in viewer numbers as well as changing viewing locations.

As can be seen from the display system 100 of FIG. 1, the challenges with using a parallax barrier are addressed by dynamically adjusting the orientation and pitch of the parallax barrier to the tracked and/or determined viewer position. In this way, the same 3D effect can be achieved from any viewing angle, distance, or height (or orientation relative to an orthogonal axis passing through the center of the tabletop display (or its upper surface)). The display system includes a viewer tracker that functions to track the viewers in the space about the tabletop display, and the controller acts to operate the parallax barrier display device and the content display device to present to each viewer unique (viewing angle-specific perspective) 3D content with the correct (pitch and orientation appropriate) parallax barrier for their present viewpoint. To avoid crosstalk between different viewers, directed illumination is used in the system that is synchronized with the display of the content and of the parallax barrier.

With regard to this directed illumination or directional backlight, light sources (such as light emitting diodes (LEDs)) of one implementation (see discussion below) are supported in the backlight assembly to face outwards toward inner surfaces of a mirrored hemisphere. This arrangement was chosen by the inventors because if a light source is placed at the hemispherical mirror's focal length, which in the case of a sphere is half of its radius away from the center, all light coming from the light source will be collimated (at least approximately with some aberrations) and exit the hemispherical mirror as a parallel beam of light (with the direction from the light source (e.g., LED) to the center of the hemispherical mirror).

Placing the light sources closer to the center of the hemispherical mirror creates a converging beam of light, which is focused to a small spot outside of the hemispherical mirror. By placing multiple light sources at a radius of half or less than half of the radius of the hemispherical mirror, different directions of parallel beams or different focused points can be generated or addressed by independently and selectively operating sets of one or more of the light sources during concurrent and synchronized operation of the device providing the parallax barrier and the device providing left and right eye content. The number of addressable directions is only limited by the number of light sources, which can easily be increased with exemplary prototypes using 150 to 400 LEDs arranged in vertical strips on an exterior surface of a hemispherical light support to face the inner surface of a hemispherical mirror with a diameter greater than that of the support (e.g., twice the radius in some cases). The viewing angles that can be achieved or supported by such a display system can be close to a solid angle of $2\pi$ (a hemisphere) (or 180 degrees*180 degrees*360 degrees).

Light shaping diffusers can be provided in the display system adjacent the screen of the display device providing parallax barriers and/or the display device proving 3D content when properly backlit by the backlight assembly (while other embodiments may provide the diffuser(s) on or near the hemispherical mirror's inner surface), and such diffusers may be used to blend between a finite number of the light sources/viewing positions. As will be appreciated, time multiplexing of the displayed content is used to allow a viewer to see different images when they move among a number of different viewing positions relative to the tabletop display (or its upper, horizontal surface or "the tabletop").

Figure 2A:
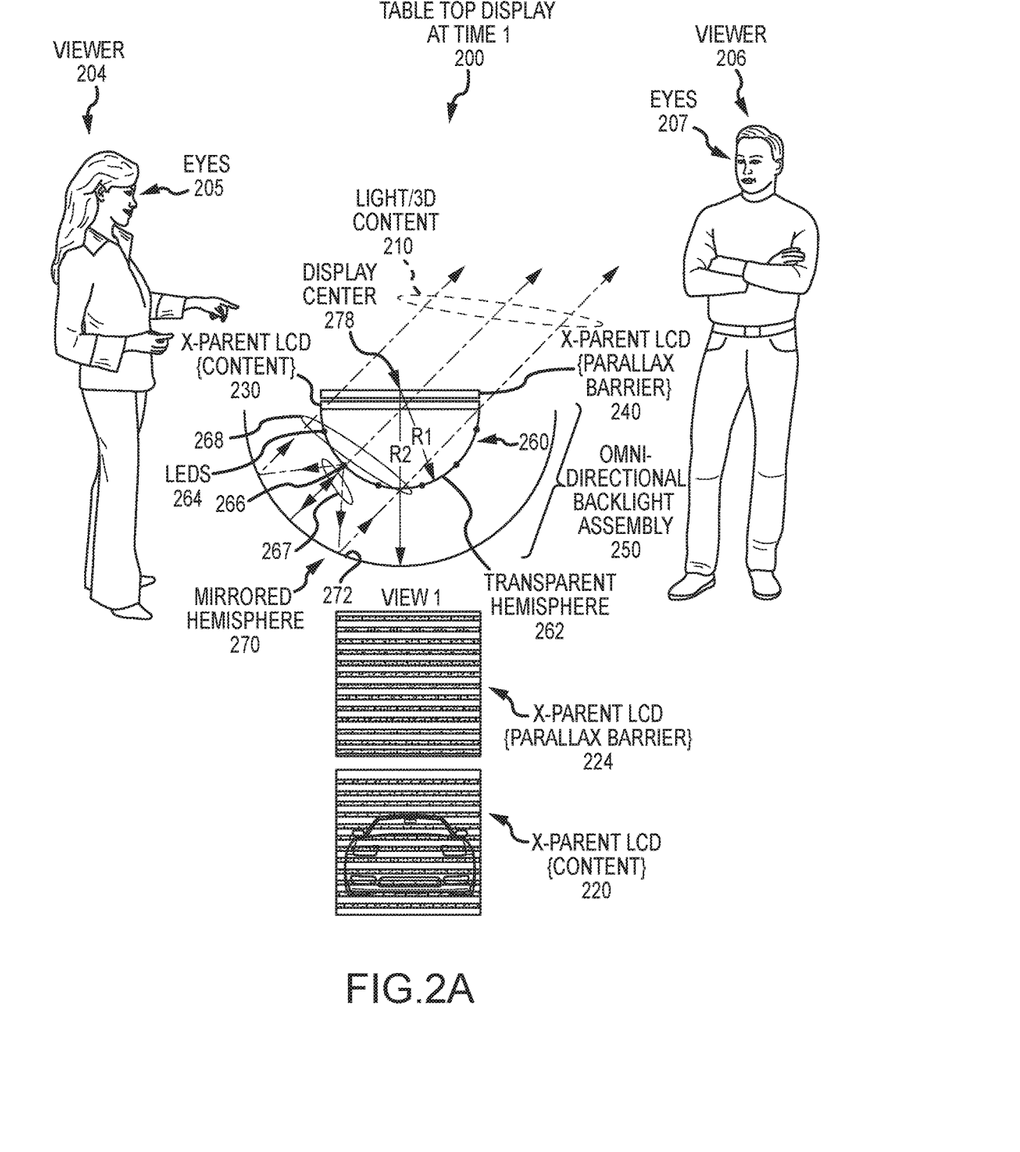
FIGS. 2A and 2B are side schematic views of an exemplary autostereoscopic tabletop display operating, respectively, in two operating states (at alternating times to provide a time multiplexed display) to provide perspective-specific 3D content to two viewers in two differing viewing locations.
Figure 2B:
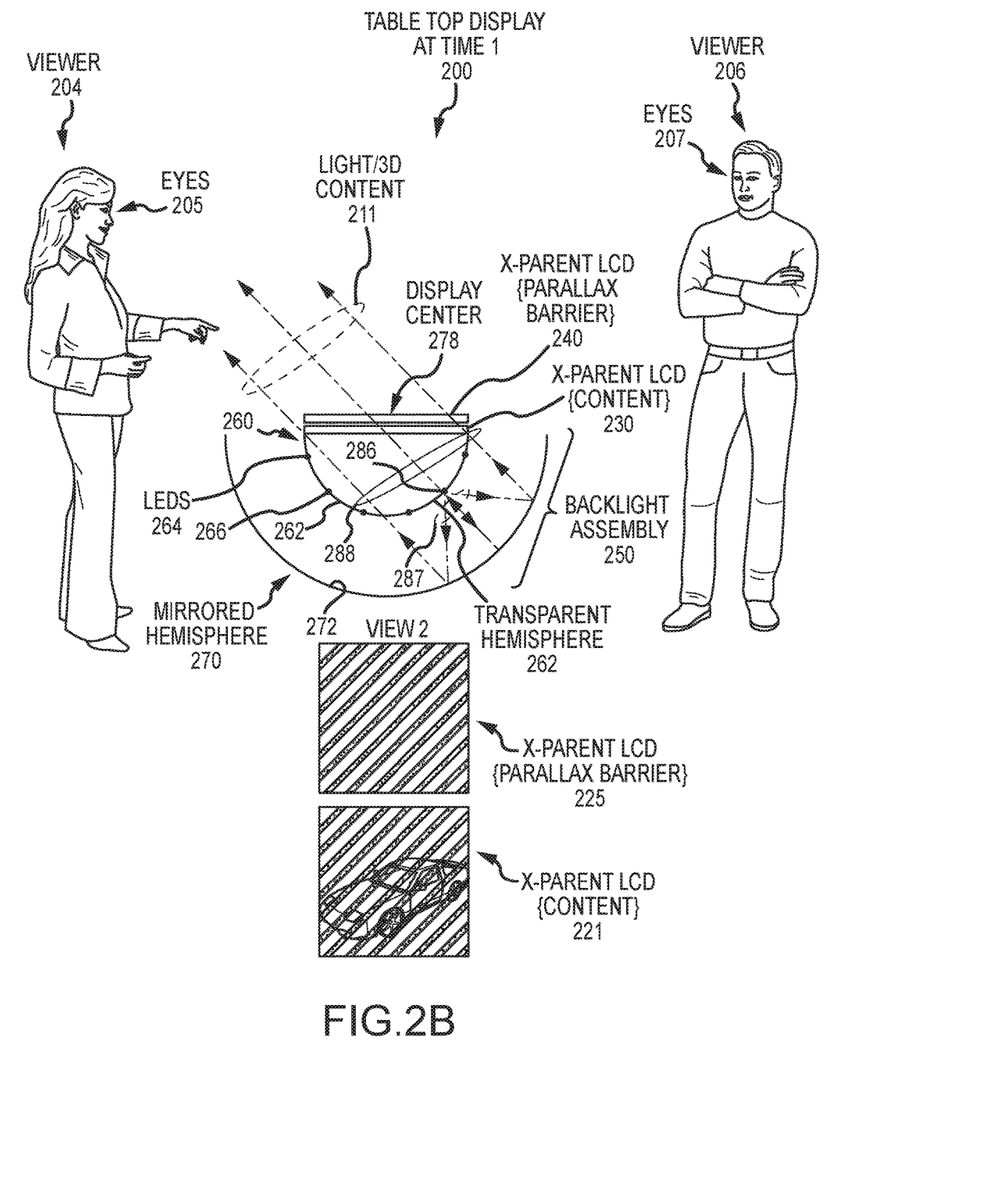

At this point in the description, it may be useful to discuss in more detail one exemplary embodiment or implementation of a multi-viewer autostereoscopic tabletop display. FIGS. 2A and 2B show side schematic views of a tabletop display 200 operating in two different operating states and/or in two time periods (or in an alternating, switching, or time multiplexed manner by a controller such as the controller 150 shown in system 100 in FIG. 1). First and second viewers 204, 206 are standing on opposite sides (or at two different locations) viewing the 3D space above the display 200 with their eyes 205, 207 at two different locations (e.g., with two different perspectives that may be defined by angular orientation and pitch).

In a first operating state/mode at a first time (Time 1) shown in FIG. 2A, light (e.g., first 3D content suited to the first location/perspective) 210 is being provided in a directional manner to the eyes 207 of the second viewer 206 by the display 200. In contrast, in a second operating state/mode at a second time (Time 2) shown in FIG. 2B, light (e.g., second 3D content suited to the second location/perspective) 211 is being provided in a directional manner to the eyes 205 of the first viewer 204 by the display 200. To this end, a controller (not shown in FIGS. 2A and 2B but understood from the discussion of FIG. 1) operates to render 3D content (e.g., left and right eye images) 220 for displaying at the first time (to the second viewer) and 3D content 221 for displaying at the second time (to the first viewer). The controller also produces first and second parallax barriers 224, 225 that are suited for the present locations of the viewer's eyes 207, 205 (with the eye locations being determined by the controller based on location tracker data collected by a tracker assembly and its equipment/components). The 3D content 220, 221 is generated to suit the present perspective/eye location of the viewer, too, and also for the corresponding parallax barrier 224, 225.

The display 200 includes a first display device (e.g., a LCD panel) 230 that is horizontally oriented and operated at Time 1 (or during a first time period or operating state of the display 200) to display the first rendered 3D content 220 and at Time 2 to display the second rendered 3D content 221. Further, the display 200 includes a second display device (e.g., a second LCD panel) 240 also arranged to be horizontally oriented and stacked upon the first display device 230 such that output of the first display device 230 must be viewed through the second display device 240. The second display device 240 is operated at Time 1 (concurrently with the first display device 230) to display the first parallax barrier 224 and at Time 2 to display the second parallax barrier 225. Hence, the 3D content 220, 221 is viewed through a parallax barrier that is particularly suited to the viewer location. The two display devices 230, 240 may be similarly sized and shaped LCD panels that are wholly overlapping or may be rotated some angle relative to each other (e.g., less than about 20 degrees) to avoid issues with Moiré patterns. In this way, dynamic parallax barriers are combined with multiplexing of 3D content, which is suited to and synchronized with a paired/corresponding parallax barrier.

To output directional light/content 210, 211 to the two viewers 206 and 204, respectively, the display 200 includes a directional backlight assembly 250. The backlight assembly 250 includes a light source support 260 that may take the form of a hemispherical dome (or bowl) with a radius, R1, as measured from a center 278 of the display 200 (e.g., a center of the outer surface of the display device 240). The hemispherical dome-shaped support 260 may be formed of a clear (transparent to translucent) material such as a glass, plastic, or ceramic to allow light to pass through it to a back surface of the display device 230. On an outer surface 262 of the dome 260, a plurality of light sources 264 are mounted so as to direct the light they produce outward from the center of the dome/display 278. The light sources 264 may be LEDs in some embodiments (e.g., white, high illumination LEDs). The number and pattern of these light sources 264 may be varied to practice the display 200 with each LED typically being independently operable by a controller (or the light sources 264 may be operable in sets such as by illuminating strips or linear-arranged sets extending from a top edge of the surface 262 of the support 260 to its pole (e.g., like the spokes or ribs of an opened umbrella)).

Further, the backlight assembly 250 includes a hemispherically-shaped outer reflector 270 with an inner surface 272 that is mirrored to reflect light from the light sources 264. The hemispherical reflector 270 is positioned so as to have a center that corresponds with the center of the light source support 260 (e.g., the center 278 of the display or another location in the display 200), and the hemispherical reflector 270 has a radius, $R_2$, that is greater than light source support 260 so as to wholly enclose the support 260. In practice, the support radius, $R_1$, is typically chosen to be one half of (or 48 to 52 percent) of the reflector radius, $R_2$. The backlight assembly 250 is omnidirectional in this configuration, with the assumption that light sources 264 are provided in adequate number in a spaced-apart pattern about the support surface 262.

During operations, the controller (not shown) acts to selectively illuminate one to many of the light sources 264 to provide directional light through the display devices 230, 240 and, preferably, to provide light in the shape of a light box associated with the face of one to four or more viewers about the display 200. As shown in FIG. 2A, during a first operating state at Time 1, the controller is operating the light source/LED 266 to generate light 267 that is directed outward toward the hemispherically-shaped reflector 270. The reflector's mirrored surface 272 acts to reflect the light 268 in a particular direction through the display device 230 to have its content visible/displayed to a viewer 206 via light 210 that has passed through the parallax barrier being displayed by display device 240. As shown in FIG. 2B, during a second operating state at Time 2, the controller is operating the light source/LED 286 to generate light 287 that is directed outward toward the hemispherically-shaped reflector 270. The reflector's mirrored surface 272 acts to reflect this light 288 in a second or different direction through the display device 230 to have it presently displayed content visible/displayed to a viewer 204 (at a different location than the viewer 206) via light 211 that has passed through the parallax barrier being displayed by display device 240.

Figure 3:
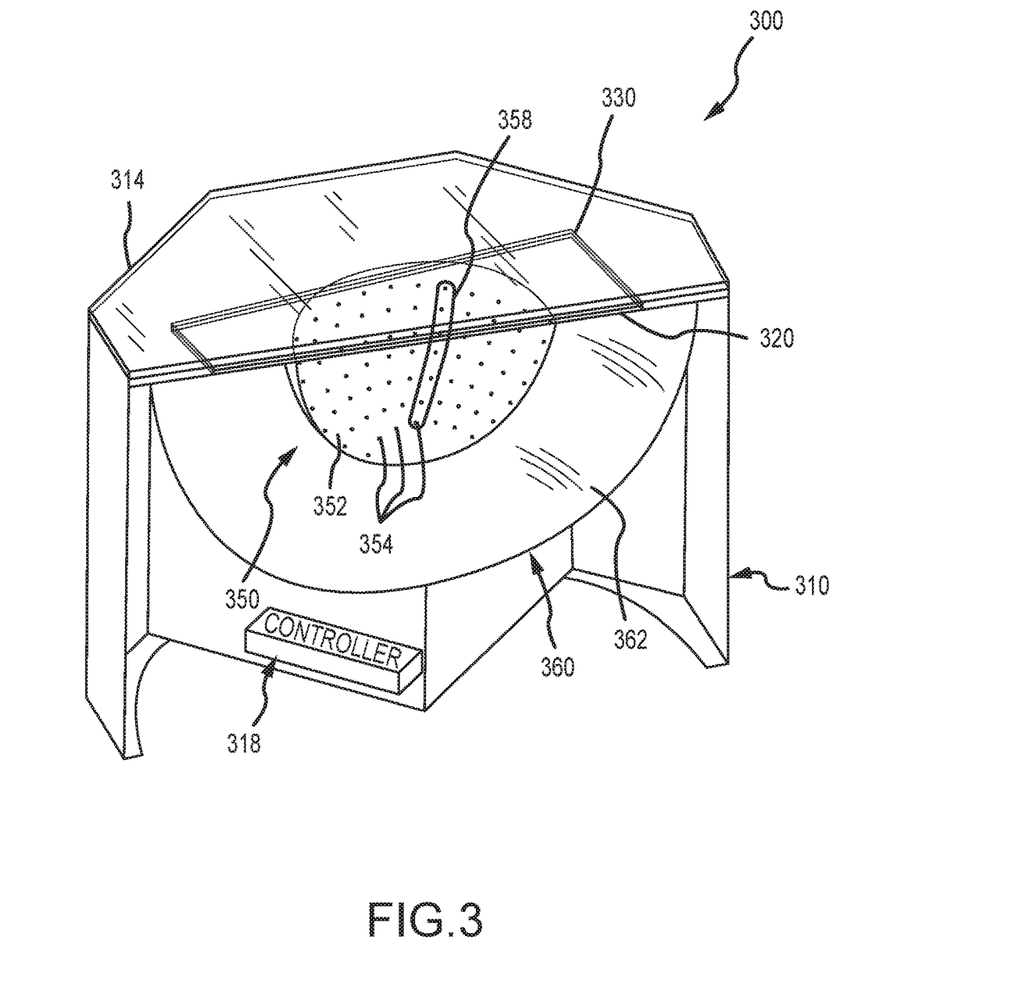
FIG. 3 is a top perspective view showing a tabletop display with a cutaway section to allow viewing of internal components.

FIG. 3 illustrates a top perspective view of an autostereoscopic tabletop display 300 with a cutaway provided to show internal components/details. The tabletop display 300 may be considered an implementation of the display system 100 of FIG. 1 or the display 200 of FIGS. 2A and 2B. As shown, the tabletop display 300 includes an outer frame or enclosure 310 that supports an upper horizontal cover or top 314, which may be a planar piece of transparent material or material that is transparent in a center portion (e.g., the portion covering the parallax barrier and 3D content display devices). A controller 318 may be provided within the interior space defined by the enclosure or frame 310, and the controller 318 may operate in a similar manner as described for controller 150 in the system 100 of FIG. 1.

The controller 318 determines viewing locations of one or more viewers located around the periphery of the top cover 314, and, in response, it renders 3D content for each viewer's perspective along with a parallax barrier suited for that viewer's perspective (with the rendered 3D content also being suited for the corresponding parallax barrier). The display 300 includes a first display device (e.g., a first LCD) 320 arranged parallel to and below a center portion of the top cover 314, and the controller 318 acts to operate the display device 320 in a time multiplexed manner to display this rendered content for each viewer's perspective. The display 300 also includes a second display device (e.g., a second LCD) 330 arranged parallel to and below a center portion of the top cover 314 (e.g., to be sandwiched between the first display device 320 and the inner surface of the top cover 314). The controller 318 acts to operate the display device 330 in a time multiplexed manner that is synchronized with operations of the first display device 320 to display the calculated/generated parallax barriers for each viewer's perspective.

A backlight assembly is provided in the display 300 that includes a plurality of light sources 354 arranged on an exterior surface 352 of a hemispherical light source support 350. The support 350 is positioned to provide the center of the hemispherical support 350 at the center of the display 300 or the center of back of panel/display device 320. The light sources 354 may be arranged in strips/vertical columns 358 that extend from an upper edge of exterior side to the pole of the hemispherical support 350, and light sources (e.g., LEDs) 354 in a strip/row (or set) 358 may be operated together as a unit to provide a particular directional light for display devices 320, 330 or may, in some cases, each be independently, selectively operable to provide backlighting that is omnidirectional (e.g., light one, two, three, or some other subset of a column/strip 358 to provide a desired lighting of a viewer's face). In other cases, two, three, or other number (depending on strip side-by-side spacing) of side-by-side (or adjacent) strips 358 may be illuminated concurrently (or subsets of such adjacent strips/columns) to illuminate a light box associated with a viewer's current location (or the location of their face and eyes at a particular time as may be determined via use of a location tracker).

The backlight assembly also includes a hemispherically-shaped reflector 360 with a radius greater in size than (e.g., twice the size of) the radius of the light support 350. The reflector 360 includes an inner mirrored surface 362 (which is also hemispherically shaped as shown) that during illumination of one-to-many of the light sources 354 acts to reflect (or redirect) light in a directional (and predictable) manner through the light support 350 (which is transparent or at least translucent to light) and onto the back surface of the first display device 320. The light then passes through this display device 320, through the second display device 330 (where it may be blocked by a displayed parallax barrier), and outward from the cover 330 to a viewer at a tracked location (which may change over time requiring different light sources 354 to be illuminated to provide different directional backlighting, requiring different 3D content to be rendered and displayed on device 320, and requiring a different "dynamic" parallax barrier to be generated and displayed on device 330 (with the controller 318 acting to provide control signals that are all synchronized to provide this functionality for display 300)).

The multi-viewer autostereoscopic tabletop displays described herein make effective use of a time multiplexed directional backlight. A directional backlight is a backlight that makes the displayed content visible from certain viewing positions while the screen/display panel appears black from other viewing positions. By quickly switching the content and backlight between different viewer positions, multiple independent views can be displayed "simultaneously" (e.g., each viewer perceives concurrent viewing as the switching occurs very rapidly (e.g., each viewer sees a 3D image 15 to 30 times per second)). For a 360-degree tabletop display, the backlight is typically configured to be able to individually address a large number of viewing positions all around at high viewing angles.

An advantage of implementing the tabletop display using time multiplexing, when compared with spatial multiplexing, is that the full panel or display device resolution can be preserved. However, the amount of views that can be multiplexed at one time without visible flicker is limited by the refresh rate of the used panel or display device. By combining spatial multiplexing in the form of a dynamic parallax barrier and temporal multiplexing in the form of a directional backlight, the autostereoscopic tabletop displays described herein can provide autostereoscopic content to one to four (at least) viewers simultaneously (four viewers at four different viewing locations about the tabletop display). The novel time multiplexed directional backlight presented can address an arbitrarily large number of viewing positions 360 degrees around the display, covering a solid angle of up to a steradian (i.e., one hemisphere). This is achieved using a hemisphere mirror to focus the light coming from light sources positioned pointing outwards on a smaller transparent hemisphere.

At small apertures, a spherical mirror of radius $r_m$ can be locally approximated as a parabolic mirror with a focal length of $f=r_m/2$. Therefore, light reflected on the mirror coming from a light source at half the radius of the sphere will be approximately collimated. Placing the light source further towards the center of the sphere at a distance do from the surface will focus the light at a distance obeying the mirror equation: $1/d_o+1/d_i=1/f$. In reality, the focal length varies for larger apertures so that outer rays are focused closer to the mirror than center rays. Choosing a smaller aperture will result in a better focusing of the rays at the expense of a smaller display area that can be backlit using the same hemisphere mirror or a larger mirror that is required for the same display size.

Figures 4A, 4B, 4C:
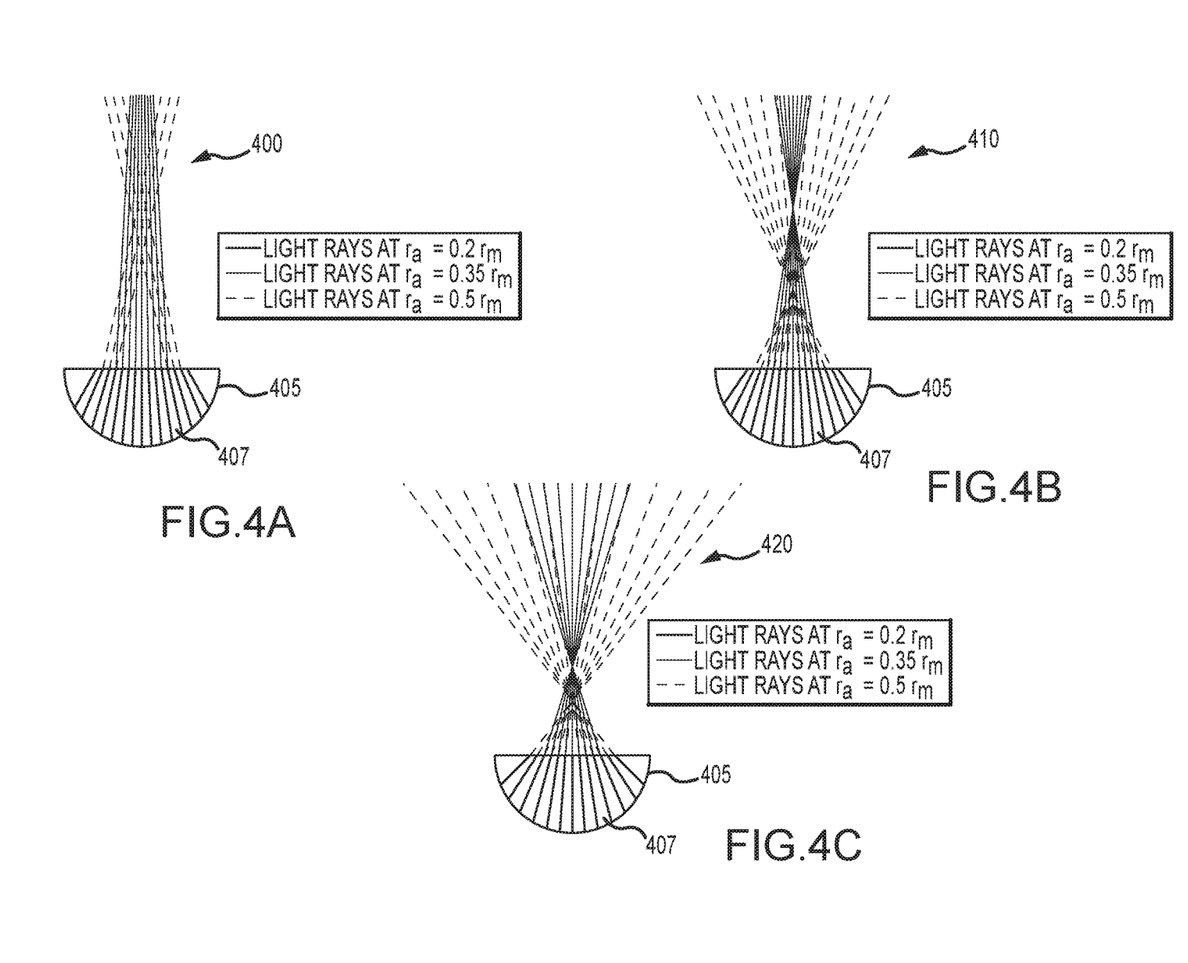
FIGS. 4A-4C illustrate ray tracings for a hemispherical mirror from a point light source.

FIGS. 4A-4C illustrate ray tracings 400, 410, 420 for a hemispherical mirror 405 from a point light source 407. The ray tracings 400, 410, 420 are provide for light originating at light sources 407 on the central axis of the hemisphere mirror 405 at various distances. Particularly, the ray tracings 400, 410, 420 are for light reflected on a hemisphere mirror 405 with a radius $r_m$ from a point light 407 pointing downwards at a distance, from the sphere center, of 0.5 $r_m$ in FIG. 4A, of 0.45 $r_m$ in FIG. 4B, and 0.4 $r_m$ in FIG. 4C. The light passes through three different circular apertures with radius $r_a$, and it can be observed that a smaller aperture leads to a better focusing of the ray.

Figure 5A:
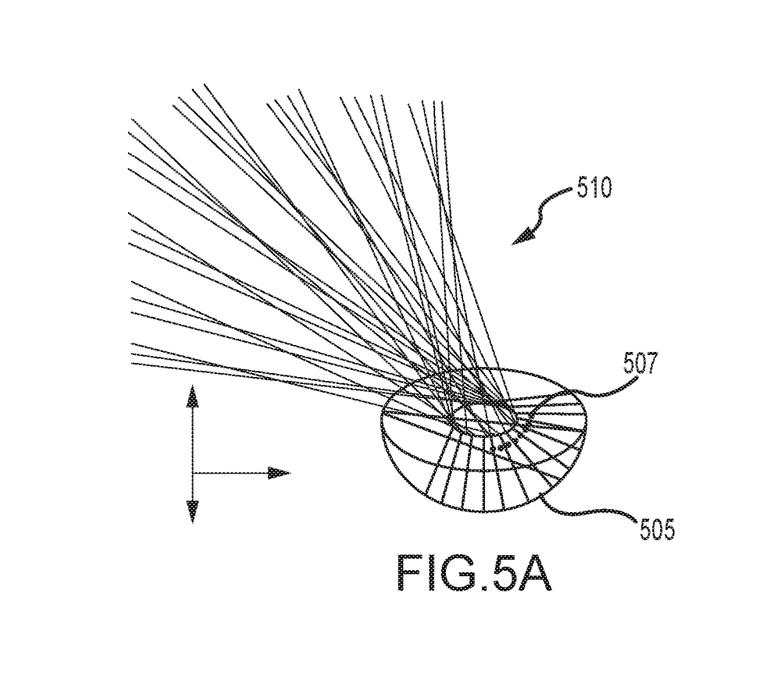
FIGS. 5A-5C illustrate, for a hemispherical mirror and eight light sources, a ray tracing from three different perspectives.
Figure 5B:
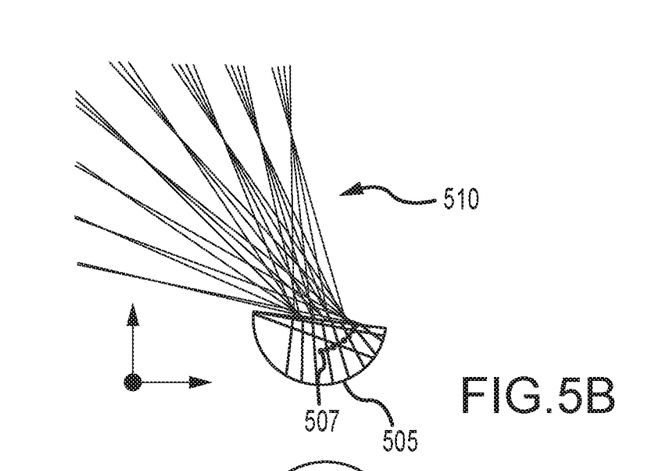
Figure 5C:
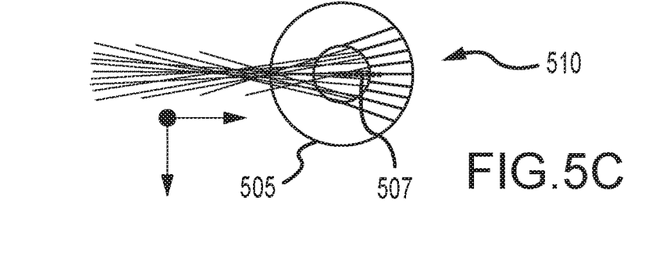

As a result of the symmetry of the spherical mirror, the same imaging properties apply for light sources on any axis through the center of the sphere. By using multiple light sources (e.g., sequentially differing LEDs), a directional backlight with an arbitrary number of views can be achieved. FIGS. 5A-5C illustrate, for a hemisphere mirror 505 and eight light sources 507, a ray tracing 510 from three different perspectives. Particularly, FIG. 5 shows ray tracing 510 of eight light sources 507 pointing outwards at 0.45 $r_m$ from the center of the sphere at the same horizontal angle and vertical angles in steps of 10 degrees from 10° to 80° with an aperture of 0.35 $r_m$. Each light source addresses a separate vertical view of the display.

Figure 6A:
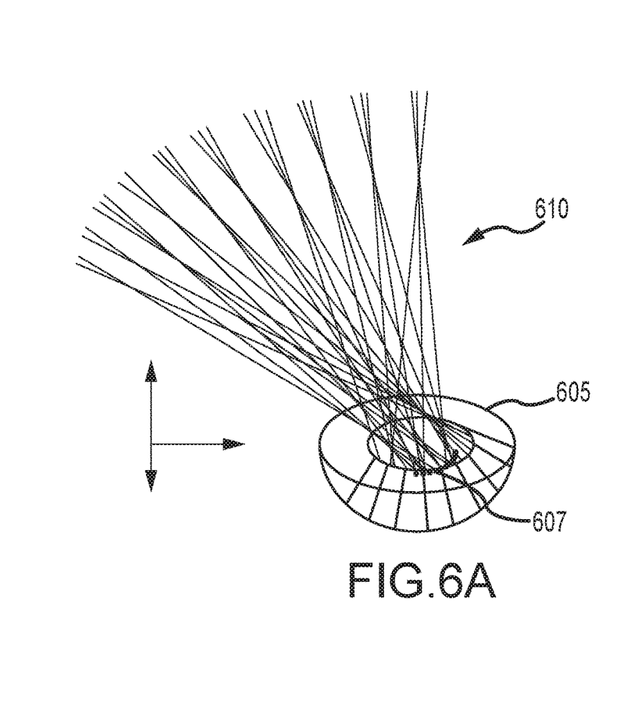
FIGS. 6A-6C illustrate, for a hemispherical mirror and ten light sources, a ray tracing from three different perspectives.
Figure 6B:
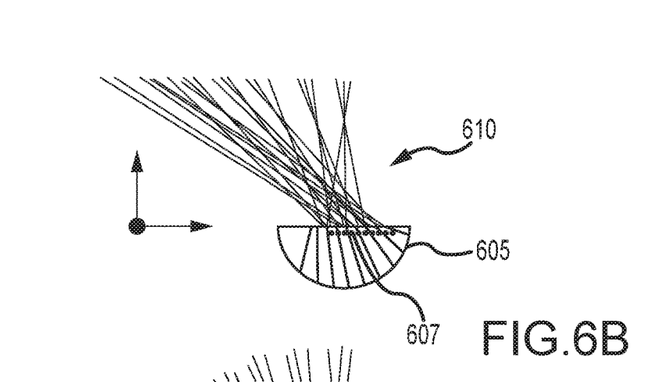
Figure 6C:
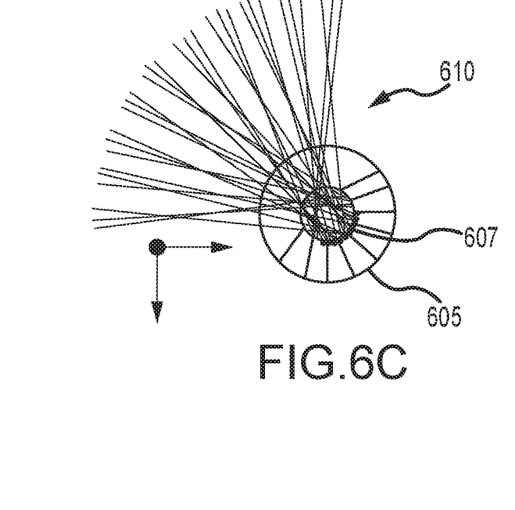

FIGS. 6A-6C illustrate, for a hemispherical mirror 605 and ten light sources 607, a ray tracing 610 from three different perspectives. The ray tracing 610 is for ten light sources 607 that are 0.45 $r_m$ from the center of the sphere at the same vertical angle of 30° and horizontal angles in steps of 10 degrees from 0° to 90° (e.g., 10 views at the same height and 10 degrees apart horizontally) with an aperture of 0.35 $r_m$. Each light source 607 addresses a separate horizontal view of the display.

By choosing an appropriately small aperture in combination with a sufficiently high number of light sources, an angular resolution high enough to separately address the eyes of a viewer can be created. However, many of the displays discussed herein use a dynamic parallax barrier for each viewer (each viewing location) such that a less accurate backlight is required, which allows the tabletop display to be built using a smaller number of light sources and higher aperture. In other implementations, the omnidirectional backlight may be used with various view multiplexing schemes/devices such as ones using a light field, random dot, or the like in place of a dynamic parallax barrier. Likewise, the specific omnidirectional backlighting implementations discussed herein are not limiting and the dynamic parallax barrier (that can adjust for orientation as well as pitch) can be used with other directional backlights than the hemisphere-within-a-hemisphere design shown in the figures. For example, the directional backlighting assembly 130 of FIG. 1 can be implemented using LED-backed lenticulars and/or a fly-eye array, using some type of multi-projector with light diffuser, or some type of edge lit film that prefers to scatter forward (e.g., in the direction of illumination).

Tracking may be accomplished in a variety of ways such as using a tracking system available from Vicon Motion Systems Ltd. or the like. In some embodiments the viewer tracking module (such as module 158) is adapted to provide motion prediction (such as Kalman filter-type motion prediction or similar techniques) to facilitate dynamic generation of parallax barriers and perspective-specific 3D content for viewing through such parallax barriers by limiting/reducing motion tracking delay and latency. A variety of display devices may be used such as a 1440p, 144 Hz, 27-inch LCD (ASUS ROG SWIFT PG278Q) or the like. The backlight assembly may take a variety of forms with one prototype using 216 LEDs on an inner transparent hemisphere and a reflector provided by a 30-inch mirror-painted acrylic bowl. Synchronization may also be achieved in a variety of ways with one prototype using Arduino sync with a photodiode, serial connection to send angles.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

The autostereoscopic tabletop displays described herein provide a number of significant advantages over prior display systems. The autostereoscopic tabletop displays provide a flat 3D tabletop surface with no complicated or moving parts. The flat tabletop surface allows real objects to be easily placed on this surface and share 3D space with synthetic objects provided by the display appearing to be above, on, and/or below the tabletop surface. The parallax barriers are adjustable (or dynamic) and are relatively simple to compute to provide 3D views to multiple viewers that may be positioned at differing viewing angles (or orientations) around the tabletop display's tabletop surface. The autostereoscopic tabletop displays also include a novel 360-degree directional backlight that provides large and, in some cases, collimated illumination that can be rapidly "steered" or redirected by the display controller or its light driver/microcontroller.

Prior multi-viewer autostereoscopic tabletop display systems with spinning elements and/or hundreds of projectors have demanding hardware and/or software (e.g., rendering algorithms) requirements, especially when it is understood that many displayed views are not seen by the viewers (e.g., displayed even though no viewers at many of the relevant viewing angles or viewpoints). Scaling these prior displays is expensive and/or difficult due to the use of rapidly moving parts and a large number of components.

In contrast, the autostereoscopic tabletop displays taught herein have no moving parts and are only practically limited by the size of the two display devices (e.g., LCD panels or the like) used to provide the dynamic parallax barriers and synchronized 3D content. The use of an LCD panel to generate/display parallax barriers allows the parallax barriers to be made to have almost any direction and pitch. With such an omnidirectional parallax barrier, objects can be placed on the tabletop surface to be in the same 3D space as content that is displayed by the other display device (e.g., second LCD panel stacked or parallel arrangement (in most cases) with the first LCD panel providing the parallax barriers). Further, many prior autostereoscopic displays required the viewer to maintain a predefined head orientation such as one perpendicular to a fixed parallax barrier orientation. In contrast, the dynamic parallax barrier design of the present autostereoscopic tabletop display works with any viewer position and head orientation.

We claim:

1. A tabletop display apparatus for displaying three dimensional (3D) images to viewers, comprising:
    a first display device horizontally oriented and operable to alternately display a first parallax and a second parallax barrier, wherein the first parallax barrier corresponds with a first viewer location relative to the first display device and the second parallax barrier corresponds with a second viewer location differing from the first viewer location;
    a second display device positioned parallel to the first display device and operable to alternately display first 3D content corresponding with the first viewer location and second 3D content corresponding with the second viewer location; and
    a directional backlight assembly operable to alternately backlight the second display device with first light directed toward the first viewer location and with second light directed toward the second viewer location,
    wherein the directional backlight assembly comprises a transparent light support with a hemispherical outer surface supporting a plurality of light sources that are independently addressable and operable to provide the first and second light, and
    wherein the directional backlight assembly further comprises a reflector element with a hemispherical, mirrored inner surface facing the hemispherical outer surface of the transparent light support to reflect the first and second light through the transparent light support to backlight the second display device.

2. The apparatus of claim 1, further comprising a controller synchronizing time multiplexed operations of the first display device, the second display device, and the directional backlight assembly whereby the first parallax barrier, the first 3D content, and the first light are provided concurrently and the second parallax barrier, the second 3D content, and the second light are provided concurrently.

3. The apparatus of claim 2, wherein the controller generates the first parallax barrier and the first 3D content and operates the directional backlight assembly based on the first viewer location and wherein the controller generates the second parallax barrier and the second 3D content and operates the directional backlight assembly based on the second viewer location.

4. The apparatus of claim 2, further comprising a tracker assembly determining the first and second viewer locations and wherein the first and second viewer locations define location, orientation, and pitch for eyes of first and second viewers being tracked by the tracker assembly.

5. The apparatus of claim 1, wherein the hemispherical outer surface has a first radius, wherein the hemispherical, mirrored inner surface has a second radius, and wherein the first radius is in the range of 45 to 55 percent of the second radius.

6. The apparatus of claim 1, wherein a first subset of the light sources is operated concurrently to provide the first light and a second subset of the light sources, differing from the first subset of the light sources, is operated concurrently to provide the second light.

7. The apparatus of claim 1, wherein the light sources each comprises a light emitting diode (LED) mounted on the hemispherical outer surface to direct light toward the hemispherical, mirrored inner surface of the reflector element.

8. An autostereoscopic display, comprising:
    a display assembly switching between projecting, when backlit, first autostereoscopic content to a first viewing location and second autostereoscopic content to a second viewing location; and
    an omnidirectional backlight assembly operable to alternately backlight the display assembly with first light directed toward the first viewing location and with second light directed toward the second viewing location, wherein the omnidirectional backlight assembly comprises a transparent light support with a hemispherical outer surface supporting a plurality of light sources that are independently addressable and operable to provide the first and second light, and wherein the omnidirectional backlight assembly further comprises a reflector element with a hemispherical, mirrored inner surface facing the hemispherical outer surface of the transparent light support to reflect the first and second light through the transparent light support to backlight the display assembly.

9. The display of claim 8, wherein the hemispherical outer surface has a first radius, wherein the hemispherical, mirrored inner surface has a second radius, and wherein the first radius is in the range of 45 to 55 percent of the second radius.

10. The display of claim 8, wherein a first subset of the light sources is operated concurrently to provide the first light and a second subset of the light sources, differing from the first subset of the light sources, is operated concurrently to provide the second light.

11. The display of claim 8, wherein the light sources each comprises a light emitting diode (LED) mounted on the hemispherical outer surface to direct light toward the hemispherical, mirrored inner surface of the reflector element.

12. The display of claim 8, further including a controller synchronizing time multiplexed operations of the display assembly and the omnidirectional backlight assembly whereby the first autostereoscopic content and the first light are provided concurrently and the second autostereoscopic content and the second light are provided concurrently in a switching manner during operations of the display.

13. The display of claim 8, wherein the display assembly includes:
    a first display device horizontally oriented and operable to alternately display a first parallax and a second parallax barrier, wherein the first parallax barrier corresponds with the first viewing and the second parallax barrier corresponds with the second viewing location; and
    a second display device positioned parallel to the first display device and operable to alternately display first 3D content corresponding with the first viewing location and second 3D content corresponding with the second viewing location.

14. An autostereoscopic tabletop display method, comprising:
    determining a location of a first viewer's eyes relative to a horizontal plane;
    determining a location of a second viewer's eyes relative to the horizontal plane;
    first backlighting a display assembly with light directed toward the location of the first viewer's eyes;
    during the first backlighting, operating the display assembly to display first autostereoscopic content;
    after the first backlighting, second backlighting the display assembly with light directed toward the location of the second viewer's eyes; and
    during the second backlighting, operating the display assembly to display second autostereoscopic content differing from the first autostereoscopic content, wherein the first and second backlighting are performed by a directional backlight assembly comprising a transparent light support with a hemispherical outer surface supporting a plurality of light sources that are independently addressable and operable to provide the light during the first and second backlighting, and wherein the directional backlight assembly further comprises a reflector element with a hemispherical, mirrored inner surface facing the hemispherical outer surface of the transparent light support to reflect the first and second light through the transparent light support to backlight the second display device.

15. The method of claim 14, wherein the hemispherical outer surface has a first radius, wherein the hemispherical, mirrored inner surface has a second radius, and wherein the first radius is in the range of 45 to 55 percent of the second radius.

16. The method of claim 14, wherein the first autostereoscopic content comprises a first parallax barrier and a first set of 3D content generated based on the location of the first viewer's eyes and the first parallax barrier and wherein the second autostereoscopic content comprises a second parallax barrier and a second set of 3D content generated based on the location of the second viewer's eyes and the second parallax barrier.

17. The method of claim 16, wherein the first parallax barrier differs from the second parallax barrier.

18. The method of claim 16, wherein the locations of the first and second viewer's eyes each includes a 3D position, an angular orientation, and a pitch.

19. An autostereoscopic tabletop display method, comprising:
    determining a location of a first viewer's eyes relative to a horizontal plane;
    determining a location of a second viewer's eyes relative to the horizontal plane;
    first backlighting a display assembly with light directed toward the location of the first viewer's eyes;
    during the first backlighting, operating the display assembly to display first autostereoscopic content;
    after the first backlighting, second backlighting the display assembly with light directed toward the location of the second viewer's eyes; and
    during the second backlighting, operating the display assembly to display second autostereoscopic content differing from the first autostereoscopic content,
    wherein the first autostereoscopic content comprises a first parallax barrier and a first set of 3D content generated based on the location of the first viewer's eyes and the first parallax barrier, and
    wherein the second autostereoscopic content comprises a second parallax barrier and a second set of 3D content generated based on the location of the second viewer's eyes and the second parallax barrier.

20. The method of claim 19, wherein the first parallax barrier differs from the second parallax barrier.

21. The method of claim 19, wherein the locations of the first and second viewer's eyes each includes a 3D position, an angular orientation, and a pitch.

* * * * *